(12) United States Patent
Nakari et al.

(10) Patent No.: US 10,927,599 B2
(45) Date of Patent: Feb. 23, 2021

(54) ROOF RACK SIDE LADDER

(71) Applicants: Timothy Nakari, Broomfield, CO (US); Michael Smith, Greeley, CO (US)

(72) Inventors: Timothy Nakari, Broomfield, CO (US); Michael Smith, Greeley, CO (US)

( * ) Notice: Subject to any disclaimer, the term of this patent is extended or adjusted under 35 U.S.C. 154(b) by 175 days.

(21) Appl. No.: 16/229,539

(22) Filed: Dec. 21, 2018

(65) Prior Publication Data

US 2020/0199936 A1     Jun. 25, 2020

(51) Int. Cl.
| | | |
|---|---|---|
| *E06C 5/24* | (2006.01) | |
| *B62D 65/16* | (2006.01) | |
| *B60R 3/00* | (2006.01) | |
| *E06C 9/08* | (2006.01) | |
| *E06C 9/06* | (2006.01) | |

(52) U.S. Cl.
CPC ............... *E06C 5/24* (2013.01); *B60R 3/005* (2013.01); *B62D 65/16* (2013.01); *E06C 9/06* (2013.01); *E06C 9/08* (2013.01); *E06C 9/085* (2013.01)

(58) Field of Classification Search
CPC ..... E06C 5/24; E06C 9/06; E06C 9/08; E06C 9/085; B60R 3/02; B60R 3/005; B63B 27/14; B63B 27/146
See application file for complete search history.

(56) References Cited

U.S. PATENT DOCUMENTS

| | | | | |
|---|---|---|---|---|
| 261,847 | A * | 8/1882 | Graff | ............... E06C 9/08 182/129 |
| 2,794,583 | A * | 6/1957 | Ernst | ............... E06C 9/08 182/97 |
| 2,946,397 | A | 7/1960 | Berberich | |
| 2,947,566 | A | 8/1960 | Tower | |
| 3,498,410 | A * | 3/1970 | Storch | ............... B63B 27/14 182/96 |
| 3,563,342 | A * | 2/1971 | Lasiter | ............... B60R 3/02 182/97 |
| 3,601,220 | A * | 8/1971 | Saucier | ............... B60R 3/02 182/84 |
| 3,672,549 | A | 6/1972 | Chorey | |
| 3,786,899 | A * | 1/1974 | Zenhausern | ............... E06C 7/182 182/93 |
| 3,826,390 | A | 7/1974 | Watson | |
| 3,888,398 | A | 6/1975 | Payne | |
| 3,963,136 | A | 6/1976 | Spanke | |
| 4,003,485 | A | 1/1977 | Edgerton | |
| 4,215,894 | A | 8/1980 | Sidlinger | |
| 4,231,448 | A * | 11/1980 | Jensen | ............... B63B 27/14 182/151 |
| 4,249,683 | A | 2/1981 | Park | |

(Continued)

*Primary Examiner* — Colleen M Chavchavadze
(74) *Attorney, Agent, or Firm* — John A. Arsenault; Daniel M. Dubuisson (57) ABSTRACT

A roof rack side ladder system is provided with a ladder assembly, a roof rack mounting assembly, and a bumper bracket. The roof rack mounting assembly attaches the upper ladder portion of the ladder assembly to the roof rack of a vehicle and provides for a dual pivot attachment of the ladder assembly to the roof rack for absorbing suspension forces while the vehicle is in transit. The bumper bracket attaches the lower ladder portion of the ladder assembly to the side bumper wing of a vehicle.

14 Claims, 5 Drawing Sheets

(56) References Cited

U.S. PATENT DOCUMENTS

| | | | |
|---|---|---|---|
| 4,386,487 A * | 6/1983 | Scott | F03D 80/88 |
| | | | 52/184 |
| 4,431,082 A | 2/1984 | Bolt | |
| 4,546,855 A * | 10/1985 | Lyons | E06C 9/02 |
| | | | 182/106 |
| 4,751,981 A | 6/1988 | Mitchell et al. | |
| 4,823,999 A | 4/1989 | Payne | |
| 4,825,975 A | 5/1989 | Symes | |
| 5,058,791 A | 10/1991 | Henriquez et al. | |
| 5,137,194 A | 8/1992 | Kodis | |
| 5,297,912 A | 3/1994 | Levi | |
| 5,398,778 A | 3/1995 | Sexton | |
| 5,518,357 A | 5/1996 | Ziaylek, Jr. | |
| 5,651,484 A | 7/1997 | Fugman | |
| 5,845,741 A * | 12/1998 | Dwyer | E06C 9/08 |
| | | | 182/84 |
| 5,884,824 A | 3/1999 | Spring, Jr. | |
| 5,996,736 A | 12/1999 | Stankiewicz | |
| 6,003,633 A * | 12/1999 | Rolson | E06C 5/02 |
| | | | 182/106 |
| 6,012,545 A * | 1/2000 | Faleide | B60R 3/02 |
| | | | 182/127 |
| 6,092,972 A | 7/2000 | Levi | |
| 6,099,231 A | 8/2000 | Levi | |
| 6,179,543 B1 | 1/2001 | Adame et al. | |
| D442,289 S | 5/2001 | Ziaylek, Jr. et al. | |
| 6,315,078 B1 * | 11/2001 | Kumher | E06C 5/02 |
| | | | 182/127 |
| 6,315,181 B1 | 11/2001 | Bradley et al. | |
| 6,397,644 B1 | 6/2002 | Gidding | |
| 6,523,730 B2 | 2/2003 | Anderson | |
| 6,739,349 B2 | 5/2004 | Kastenschmidt et al. | |
| 6,761,296 B2 | 7/2004 | Ford et al. | |
| 6,837,338 B2 | 1/2005 | Grover | |
| 6,913,114 B1 | 7/2005 | Blehm | |
| 6,929,162 B1 | 8/2005 | Jordan | |
| 6,948,588 B1 * | 9/2005 | Chustak | B63B 27/146 |
| | | | 114/362 |
| 6,971,478 B2 * | 12/2005 | Bareket | B60R 3/00 |
| | | | 182/127 |
| 7,080,713 B1 * | 7/2006 | Riggs | B60R 3/02 |
| | | | 182/127 |
| 7,097,409 B2 | 8/2006 | Richter | |
| 7,137,479 B2 | 11/2006 | Ziaylek et al. | |
| 7,210,721 B1 | 5/2007 | Bell | |
| 7,311,176 B2 | 12/2007 | Stevens | |
| 7,549,831 B2 | 6/2009 | Hendley et al. | |
| 7,721,849 B2 | 5/2010 | Graffy et al. | |
| 7,992,682 B2 | 8/2011 | Ziaylek | |
| 8,215,453 B2 | 7/2012 | Mickens | |
| 8,322,580 B1 | 12/2012 | Hamilton | |
| 8,585,107 B2 | 11/2013 | Kekich, Jr. et al. | |
| 8,827,038 B2 * | 9/2014 | Salzman | B60R 3/02 |
| | | | 182/127 |
| 8,991,889 B1 | 3/2015 | Levi et al. | |
| 9,371,040 B2 | 6/2016 | Townsend | |
| 9,506,292 B2 | 11/2016 | Levi | |
| 9,694,756 B2 | 7/2017 | Pullman et al. | |
| 9,745,026 B1 * | 8/2017 | Cummings | B63B 27/146 |
| 9,796,340 B2 | 10/2017 | Bharucha | |
| 9,945,179 B1 * | 4/2018 | Joldersma | E06C 5/24 |
| 10,030,446 B2 | 7/2018 | Badillo | |
| 10,738,532 B2 * | 8/2020 | Badillo | B60R 3/005 |
| 2003/0034206 A1 | 2/2003 | Carroll, Jr. | |
| 2004/0047716 A1 | 3/2004 | Hendley et al. | |
| 2005/0079036 A1 | 4/2005 | Richter | |
| 2005/0126855 A1 * | 6/2005 | Tilley | E06C 7/48 |
| | | | 182/107 |
| 2006/0108179 A1 | 5/2006 | Sieb | |
| 2006/0185933 A1 | 8/2006 | Thibault | |
| 2007/0090139 A1 | 4/2007 | McKenzie | |
| 2007/0182194 A1 * | 8/2007 | Wood | B60P 1/435 |
| | | | 296/62 |
| 2007/0183875 A1 | 8/2007 | Thibault | |
| 2007/0194068 A1 | 8/2007 | Thompson | |
| 2009/0140021 A1 | 6/2009 | Richter et al. | |
| 2010/0096215 A1 | 4/2010 | McFarlane | |
| 2013/0248567 A1 | 9/2013 | Townsend | |
| 2016/0207471 A1 | 7/2016 | Paunov et al. | |
| 2017/0101823 A1 * | 4/2017 | Yenser | F03D 80/80 |
| 2017/0144605 A1 * | 5/2017 | Kelly | B60R 3/02 |
| 2018/0186298 A1 | 7/2018 | Parker | |
| 2019/0061629 A1 * | 2/2019 | Gemme | E06C 7/06 |
| 2019/0176707 A1 * | 6/2019 | Liao | B60R 3/02 |

* cited by examiner

ROOF RACK SIDE LADDER

STATEMENT REGARDING FEDERALLY SPONSORED RESEARCH AND DEVELOPMENT

Not Applicable.

FIELD OF THE INVENTION

The present invention relates generally to vehicle ladders and relates more specifically to accessing topside vehicle storage using a ladder.

BACKGROUND OF THE INVENTION

Several vehicle ladder systems are known in the art; however, many vehicle ladder inventions in the art are limited and do not address the several issues that arise with ladder systems installed to the rear door or rear hatch of the vehicle, including obstruction of view through the rear window from the seat of the driver, hindrance to cleaning and maintenance of the rear window, and lack of access to the top of the vehicle while the rear door or rear hatch opened. Furthermore, many vehicle ladder inventions in the art do not address the issue of the ladder putting force on the roof rack or vehicle while in transit nor do they provide a ladder that easily attaches and detaches onto the vehicle.

SUMMARY OF THE DISCLOSURE

The present invention provides a roof rack side ladder system for installing a ladder assembly to the side of a vehicle and allowing access to the roof of a vehicle having a roof rack and a side bumper wing. In a preferred embodiment, the roof rack side ladder system comprises a ladder assembly having an upper ladder portion and a lower ladder portion, a rack mounting assembly for securing the upper ladder portion of the ladder assembly to the roof rack, and a bumper bracket for securing the lower ladder portion of the ladder assembly to the side bumper wing of the vehicle. In a further embodiment, the ladder assembly further comprises one or more bends for improved installment of the roof rack ladder system to more numerous vehicles. In an embodiment, the ladder assembly comprises two side rails oriented in parallel and interconnected by a plurality of rungs, two rung tabs directly fastened to a top rung of the plurality of rungs, and two lower rail support clevises, each lower rail support clevis directly fastened to one of the side rails adjacent to the lower ladder portion. In an embodiment, each rung tab comprises a tab slot for securing the top rung to the rack mounting assembly, and a concave portion directly fastened to the top rung. In a further embodiment, the bumper bracket comprises a mounting extension having a terminal extension at each end protruding from the mounting extension at substantially 90 degrees, wherein each terminal extension defines a bracket slot adapted for receiving a lower fastener for securing one of the lower rail support clevises thereto the terminal extension.

In an embodiment, the rack mounting assembly comprises a rack plate, a rack plate clevis directly fastened to the center thereof the rack plate, a connecting arm having a first end portion and a second end portion, and a first pivot fastener for securing the first end portion of the connecting arm to the rack plate clevis, wherein the first pivot fastener is inserted there through the rack plate clevis and a first connecting arm slot on the first end portion of the connecting arm. In a further embodiment, the rack mounting assembly further comprises a grommet for preventing frictional damage between the connecting arm and the rack plate clevis, wherein the grommet is inserted there through the first connecting arm slot, whereby the first pivot fastener is further inserted there through a grommet slot of the grommet. In a further embodiment, the second end portion of the connecting arm is secured there between the two rung tabs via a second pivot fastener. In a further embodiment, the two rung tabs are sufficiently spaced apart for allowing the ladder assembly to twist relative to the rack mounting assembly. The connecting arm is thus rotatable about the first pivot fastener and lessens load transfer between the roof rack and the vehicle body. In an embodiment, the first pivot fastener or the second pivot fastener are snap pins.

In an embodiment, the roof rack side ladder system further comprises two lower fasteners for securing the lower ladder portion of the ladder assembly to the bumper bracket, wherein each lower fastener is inserted there through one of the bracket slots and one of the lower rail support clevises. In a further embodiment, the lower fasteners are camlocks, wherein each camlock comprises a camlock nut, a camlock bolt, and a lever, wherein the camlock nut comprises threading matching that of the camlock bolt and is rotatable about the camlock bolt for tightening or loosening the camlock bolt against one of the lower rail support clevises and one of the terminal extensions, whereby rotation of the lever to a locked configuration increases force of the camlock bolt to one of the lower rail support clevis and one of the terminal extension, whereby rotation of the lever to an unlocked configuration lessens force of the camlock bolt to the lower rail support clevis and the terminal extension The installment of the roof rack side ladder system to a vehicle offers several benefits over the prior art. The installment of the ladder to the side of the vehicle instead of the rear hatch is advantageous owing to improved visibility through the rear window, ease of cleaning and maintaining the rear window, and allowing a user to access the top of a vehicle while the rear lift gate, tail gate, or rear door is open. The dual-pivot attachment of the top of the ladder to the roof rack allows the rack to move up and down freely as well as twist, thereby ensuring that the ladder does not introduce an undesirable and damaging force to the roof rack or the vehicle body during normal vehicle operation. Furthermore, the dual pivot attachment of the connecting arm and the lower fastener attachment of the lower part of the ladder assembly to the bumper bracket allow for quick and convenient installation and removal of the ladder assembly, which helps prevent theft and eases removal of the ladder assembly where tight obstacles are encountered or where the clearance between the obstacle and ladder is of concern.

Embodiments include one, more, or any combination of all of the features listed above. Other features and advantages of the present invention will become apparent from the following more detailed description, taken in conjunction with the accompanying, which illustrate, by way of example, the principles of the invention.

REFERENCE NUMERALS IN THE DRAWINGS roof rack 4
side bumper wing 5
rack mounting assembly 10
rack plate 11
rack plate clevis 12
rack plate slots 13
connecting arm 14
pivot fastener 15
first pivot fastener 15a
second pivot fastener 15b
grommet 16
first end portion 17
second end portion 18
first connecting arm slot 24a
second connecting arm slot 24b
rack plate clevis slots 26
lower clevis slot 27
grommet slot 28
mounting extension slot 29
ladder assembly 30
side rail 31
rung 32
rung tab 33
lower rail support clevis 34
upper ladder portion 35
lower ladder portion 36
bend 37
top rung 38
bottom rung 39
concave portion 40
tab slot 41
bumper bracket 44
mounting extension 45
terminal extension 46
bracket slot 47
lower fastener 48
bracket bolt 49
camlock lever 50
camlock nut 51
camlock bolt 52

DETAILED DESCRIPTION OF THE DISCLOSED EMBODIMENT

Illustrative embodiments of the invention are described below in the accompanying Figures. The following detailed description provides detailed schematics for a thorough understanding of and an enabling description for these embodiments. One having ordinary skill in the art will understand that the invention may be practiced without certain details. In other instances, well-known structures and functions have not been shown or described in detail to avoid unnecessarily obscuring the description of the embodiments. In the description, terms such as "front", "side", and "bottom" should be construed to refer to orientation as then described or as shown in the drawings under discussion. These terms are for convenience of description and do not require that the system or component of the system be operated in a particular orientation.

Figure 1:
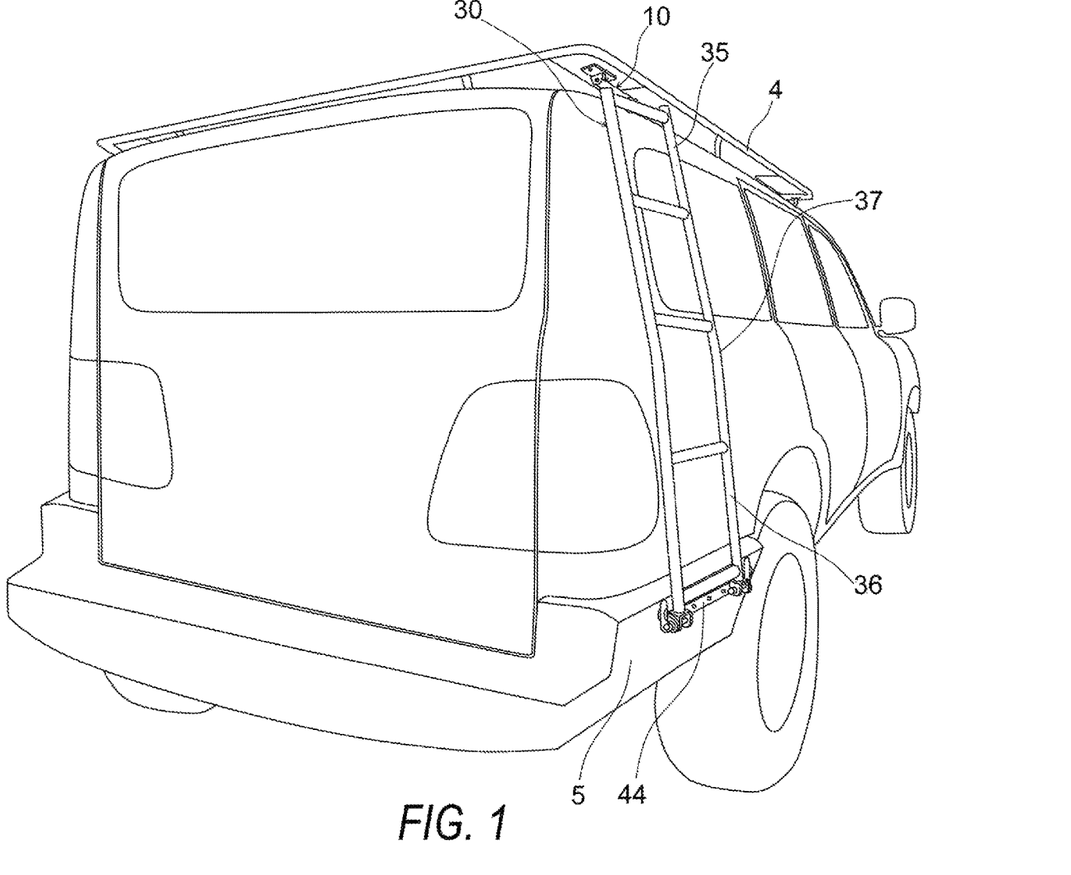
FIG. 1 is a perspective view of the roof rack side ladder system installed onto a vehicle, in accordance with an exemplary embodiment of the present invention.

FIG. 1 is a perspective view of the roof rack side ladder system installed onto a vehicle, in accordance with an exemplary embodiment of the present invention. The system comprises a ladder assembly 30 for allowing passage to the roof of a vehicle having a roof rack 4, a rack mounting assembly 10 for fastening the ladder assembly 30 to the roof rack 4, and a bumper bracket 44 for fastening the ladder assembly 30 to the side bumper wing 5 of the vehicle bumper 3. In an embodiment, the ladder assembly 30 may further comprise one or more bends 37 for improved installment of the roof rack ladder system to more numerous vehicles. Bends 37 allow the upper ladder portion 35, the lower ladder portion 36, and regions of the ladder assembly 30 there between to be oriented in different directions so the ladder assembly 30 can better follow the contour of vehicle side for which the roof rack side ladder system is installed. The installation of the present system to the side of a vehicle ensures that visibility through the rear window, as well as cleaning and maintenance of the rear window, are not obstructed by a ladder. Furthermore, the rear door or rear hatch of the vehicle may be opened without denying access to the vehicle roof. This is particularly advantageous when the rear side of the vehicle is being used for cooking or other outdoor activity preparations.

Figure 2A:
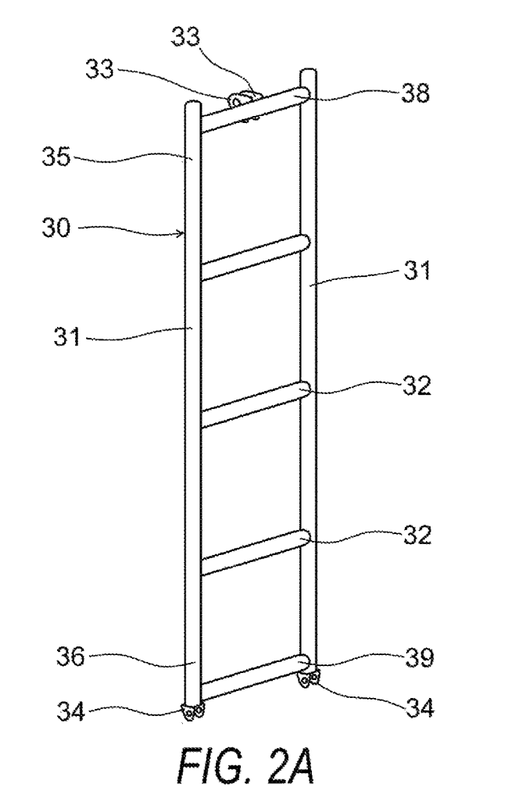
FIG. 2A is a perspective view of a ladder assembly, in accordance with an exemplary embodiment of the present invention.
Figure 2B:
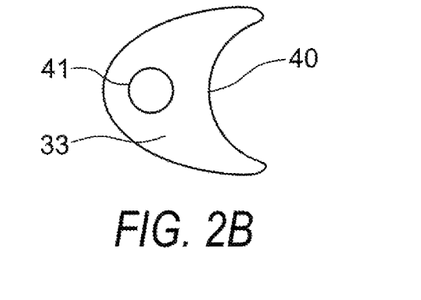
FIG. 2B is a side view of a rung tab, in accordance with an exemplary embodiment of the present invention.
Figure 2C:
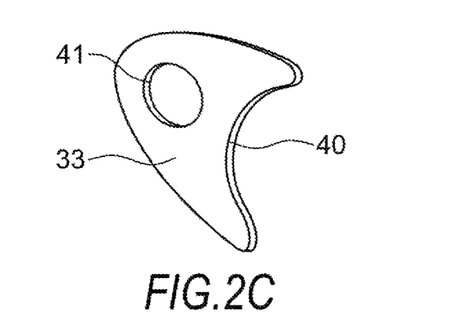
FIG. 2C is a perspective view of a rung tab, in accordance with an exemplary embodiment of the present invention.
Figure 2D:
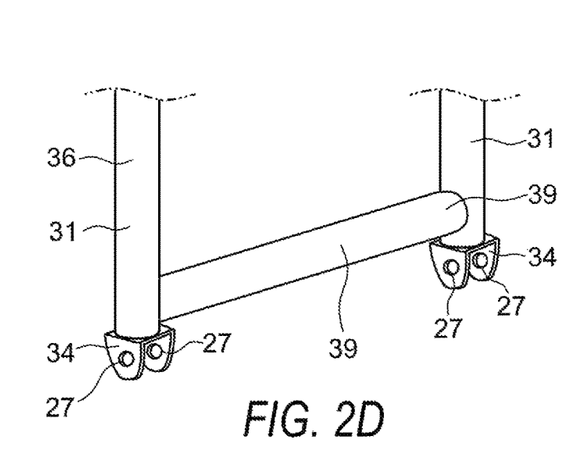
FIG. 2D is a close up perspective view of the lower ladder portion shown in FIG. 2A, in accordance with an exemplary embodiment of the present invention.
Figure 2E:
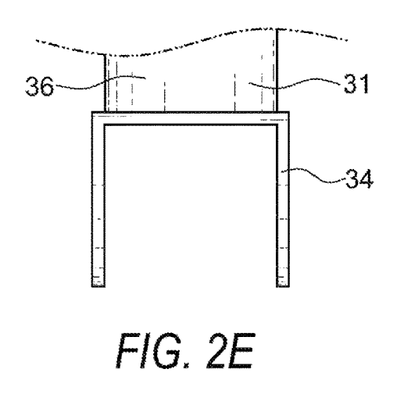
FIG. 2E is a front view of a lower rail support clevis, in accordance with an exemplary embodiment of the present invention.

FIG. 2A is a perspective view of a ladder assembly 30, in accordance with an exemplary embodiment of the present invention. FIG. 2B is a side view of a rung tab 33, in accordance with an exemplary embodiment of the present invention. FIG. 2C is a perspective view of a rung tab 33, in accordance with an exemplary embodiment of the present invention. FIG. 2D is a close up perspective view of the lower ladder portion 36 shown in FIG. 2A, in accordance with an exemplary embodiment of the present invention. FIG. 2E is a front view of a lower rail support clevis 34, in accordance with an exemplary embodiment of the present invention. The ladder assembly 30 comprises two side rails 31, two rung tabs 33, and two lower rail support clevises 34. The two side rails 31 are orientated in parallel and are interconnected by a plurality of rungs 32, including a top rung 38 and a bottom rung 39. The two rung tabs 33 are directly fastened to the top rung 38 and provide a means for attaching the upper ladder portion 35 of the ladder assembly 30 to the rack mounting assembly 10. Each rung tab 33 comprises a tab slot 41 for securing the top rung 38 to the rack mounting assembly 10, and a concave portion 40 directly fastened to and adapted to match the curvature of the top rung 38. The lower support clevises 34 each comprise one or more lower clevis slots 27 and are each directly fastened to the lower ladder portion 36 of each side rail 31 proximate to the bottom rung 39. The lower support clevises 34 provide a means for attaching the lower ladder portion 36 of the ladder assembly 30 to a side bumper wing 5 of a vehicle via the bumper bracket 44.

Figure 3A:
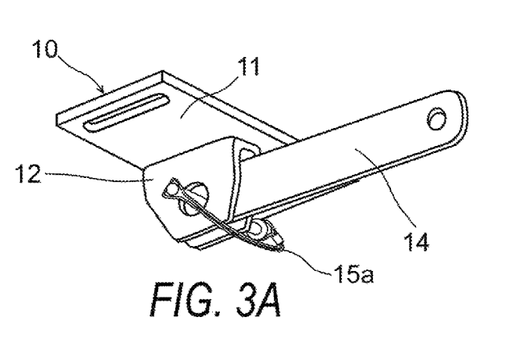
FIG. 3A is a perspective view of a rack mounting assembly, in accordance with an exemplary embodiment of the present invention.
Figure 3B:
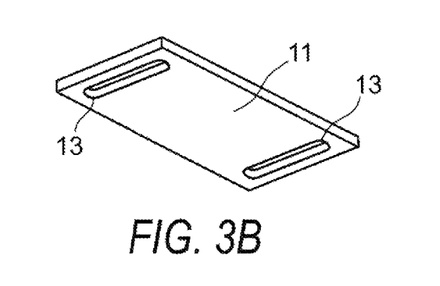
FIG. 3B is a perspective view of the rack plate shown in FIG. 3A, in accordance with an exemplary embodiment of the present invention.
Figure 3C:
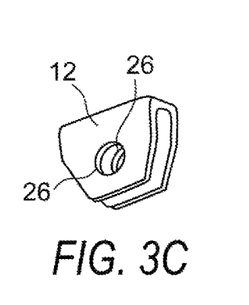
FIG. 3C is a perspective view of the rack plate clevis shown in FIG. 3A, in accordance with an exemplary embodiment of the present invention.
Figure 3D:
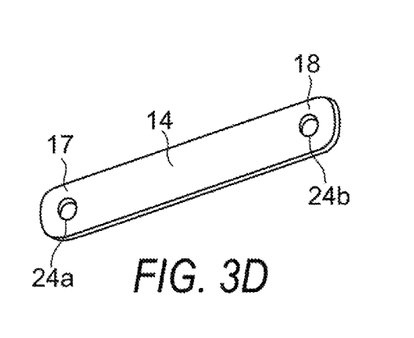
FIG. 3D is a perspective view of the connecting arm shown in FIG. 3A, in accordance with an exemplary embodiment of the present invention.
Figure 3E:
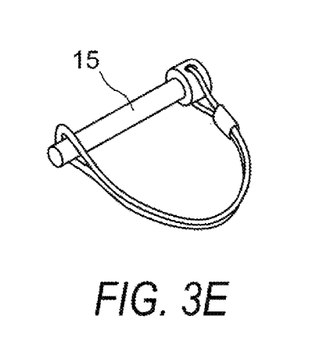
FIG. 3E is a perspective view of a pivot fastener in the form of a snap pin, in accordance with an exemplary embodiment of the present invention.
Figure 3F:
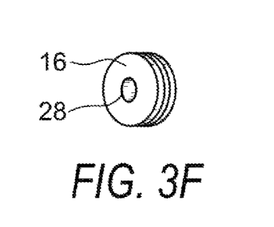
FIG. 3F is a perspective view of a grommet, in accordance with an exemplary embodiment of the present invention.
Figure 3G:
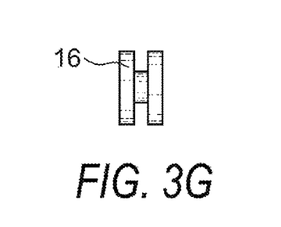
FIG. 3G is a front view of the grommet shown in FIG. 3F, in accordance with an exemplary embodiment of the present invention.

FIG. 3A is a perspective view of a rack mounting assembly 10, in accordance with an exemplary embodiment of the present invention. FIG. 3B is a perspective view of the rack plate 10 shown in FIG. 3A, in accordance with an exemplary embodiment of the present invention. FIG. 3C is a perspective view of the rack plate clevis 12 shown in FIG. 3A, in accordance with an exemplary embodiment of the present invention. FIG. 3D is a perspective view of the connecting arm 14 shown in FIG. 3A, in accordance with an exemplary embodiment of the present invention. FIG. 3E is a perspective view of a pivot fastener 15 in the form of a snap pin, in accordance with an exemplary embodiment of the present invention. FIG. 3F is a perspective view of a grommet 16, in accordance with an exemplary embodiment of the present invention. FIG. 3G is a front view of the grommet 16 shown in FIG. 3F, in accordance with an exemplary embodiment of the present invention. The rack mounting assembly 10 comprises a rack plate 11 with a rack plate clevis 12 directly fastened to the center thereof, a connecting arm 14 for attaching the rack mounting assembly 10 with the top rung 38 of the ladder assembly 30, a first pivot fastener 15a for securing the first end portion 17 of the connecting arm 14 to the rack plate clevis 12, and a second pivot fastener 15b for securing the second end portion 18 of the connecting arm 14 between the rung tabs 33 on top rung 38. During installation of the roof rack side ladder system to a vehicle, the rack plate 11 is directly fastened, generally with bolts through the rack plate slots 13, to the bottom side of a roof rack 4. A grommet 16, or bushing, is generally installed there through the first connecting arm slot 24a positioned adjacent to a first end portion 17 of the connecting arm 14 and prevents frictional damage and noise that may otherwise occur between the connecting arm 14 and the rack plate clevis 12. A first pivot fastener 15a is inserted there through the rack plate clevis slots 26 and the grommet slot 28 and secures the first end portion 17 of the connecting arm 14 to the rack plate clevis 12. In embodiments, the first pivot fastener 15a or the second pivot fastener 15b may take the form of a nut and bolt or other types of fasteners; however, a pivot fastener 15 such as the snap pin shown in FIG. 3E allows a user to install or disconnect the upper ladder portion 35 to and from the rack mounting assembly 10 without requiring tools.

Figure 4:
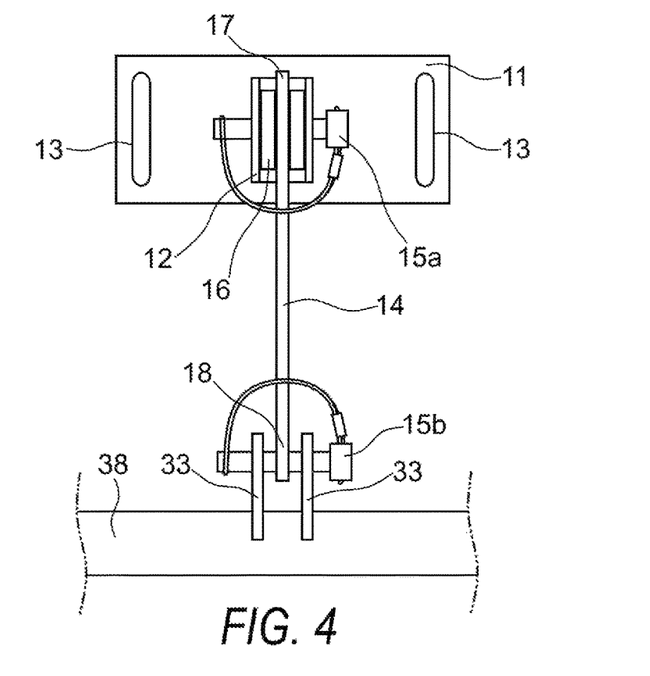
FIG. 4 is a bottom view of a rack mounting assembly fastened to the top rung of a ladder assembly via two rung tabs, in accordance with an exemplary embodiment of the present invention.

FIG. 4 is a bottom view of a rack mounting assembly 10 fastened to the top rung 38 of a ladder assembly 30 via two rung tabs 33, in accordance with an exemplary embodiment of the present invention. The second end portion 18 of the connecting arm 14 is secured there between the two rung tabs 33 via a second pivot fastener 15b inserted there through the tab slots 31 and the second connecting arm slot 24b. The first pivot fastener 15a and grommet 16 attachment of the connecting arm 14 to the rack plate clevis 12 allows rotation of the connecting arm 14 about the pivot fastener 15. The spacing between the two rung tabs 33 is sufficiently greater than the thickness of the connecting arm 14 so that the ladder assembly 30 is able to twist relative to the rack mounting assembly 10. Furthermore, rotation of the connecting arm 14 about the second pivot fastener 15b at the second end portion 18 further lessens load transfer between the roof rack 4 and the vehicle body while the vehicle is in motion.

Figure 5:
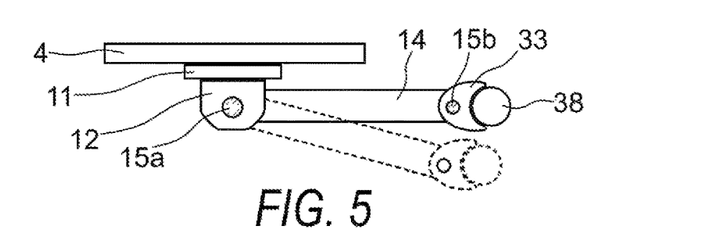
FIG. 5 is a side view of a rack mounting assembly fastened to a roof rack and the rung tabs of the ladder assembly, in accordance with an exemplary embodiment of the present invention.

FIG. 5 is a side view of a rack mounting assembly 10 fastened to a roof rack 4 and the rung tabs 33 of the ladder assembly 10, in accordance with an exemplary embodiment of the present invention. The dual pivot attachment nature of this embodiment of the present invention lessens or eliminates load transfer between the roof rack 4 and the vehicle body while the vehicle is in motion by allowing enough sufficient upward and downward movement of the ladder assembly 30.

Figure 6:
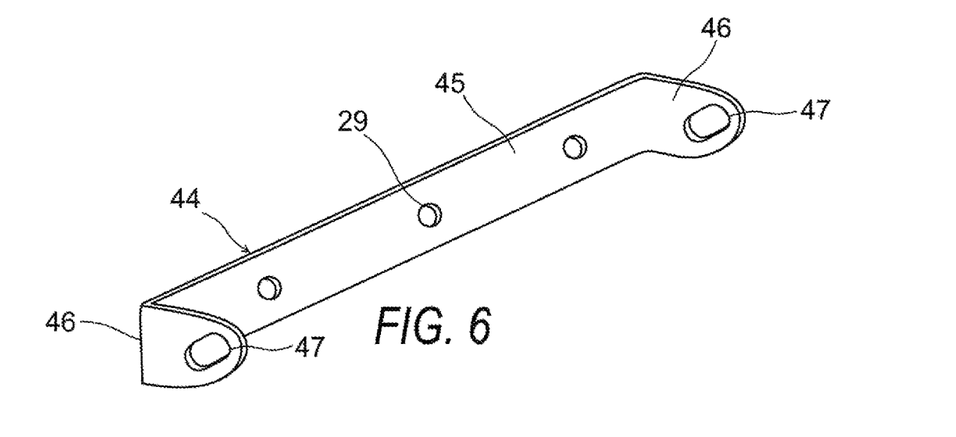
FIG. 6 is a perspective view of a bumper bracket, in accordance with an exemplary embodiment of the present invention.

FIG. 6 is a perspective view of a bumper bracket 44, in accordance with an exemplary embodiment of the present invention. In an embodiment, the bumper bracket 44 comprises a mounting extension 45 having a terminal extension 46 at each opposing end. The terminal extensions 46 protrude from the mounting extension 45 at substantially 90 degrees, and each has a bracket slot 47 adapted to receive a lower fastener 48, which is also inserted there through the lower clevis slots 27 of the lower rail support clevis 34. During installation of the bumper bracket 44 to the side bumper wing 5 of a vehicle, the mounting extension 45 is directly fastened to a desirable location on the side bumper wing 5.

Figure 7:
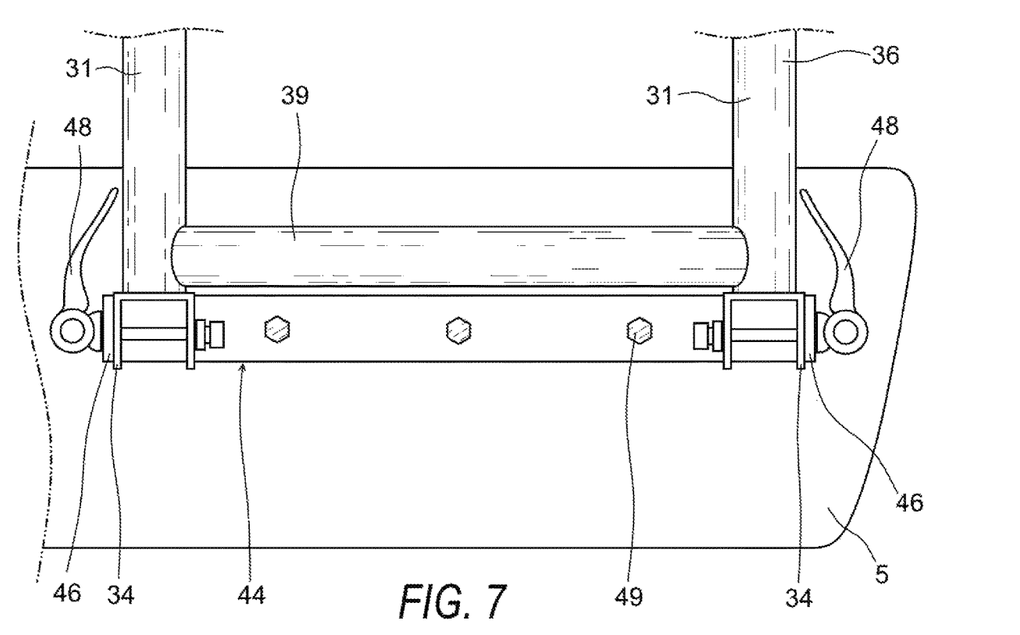
FIG. 7 is a front view of the lower ladder portion of the ladder assembly installed onto a bumper bracket using two lower fasteners in the form of camlocks, in accordance with an exemplary embodiment of the present invention.

FIG. 7 is a front view of the lower ladder portion 36 of the ladder assembly 30 installed onto a bumper bracket 44 using two lower fasteners 48 in the form of camlocks, in accordance with an exemplary embodiment of the present invention. The bumper bracket 44 is installed onto a side bumper wing 5, generally with bracket bolts 49 mounted there through mounting extension slots 29, and a lower fastener 48 is inserted there through each bracket slot 47 and the lower clevis slots 27 of each lower rail support clevis 34 to secure the lower ladder portion 36 of the ladder assembly 30 to the bumper bracket 44.

Figure 8A:
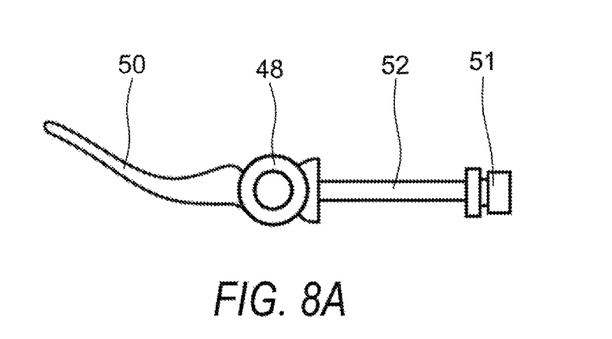
FIG. 8a is a front view of camlock type of lower fastener used secure the lower ladder portion of the ladder assembly to a bracket slot of the bumper bracket, wherein the camlock is in an unlocked configuration, in accordance with an exemplary embodiment of the present invention.
Figure 8B:
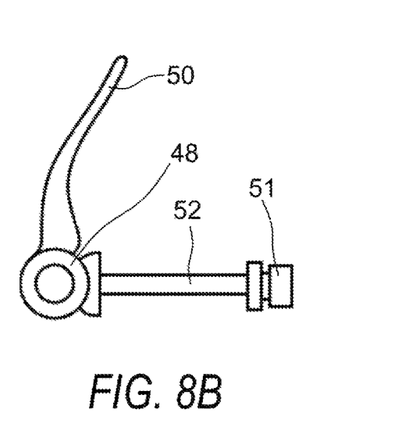
FIG. 8b is a front view of camlock type of lower fastener used secure the lower ladder portion of the ladder assembly to a bracket slot of the bumper bracket, wherein the camlock is in a locked configuration, in accordance with an exemplary embodiment of the present invention.

FIG. 8a is a front view of camlock type of lower fastener 48 used secure the lower ladder portion 36 of the ladder assembly 30 to a bracket slot 47 of the bumper bracket 44, wherein the camlock is in an unlocked configuration, in accordance with an exemplary embodiment of the present invention. FIG. 8b is a front view of camlock type of lower fastener 48 used secure the lower ladder portion 36 of the ladder assembly 30 to a bracket slot 47 of the bumper bracket 44, wherein the camlock is in a locked configuration, in accordance with an exemplary embodiment of the present invention. During installment of this example embodiment of the lower fastener 48, the camlock nut 51 is rotated about the camlock bolt 52, for which it comprises threading matching that of the camlock bolt 52, until the camlock bolt 52 contacts the lower rail support clevis 34. The user then can rotate the lever to the locked configuration to further increase the force of the camlock bolt 52 to the lower rail support clevis 34. A user can perform the reverse of this process to loosen the camlock type of lower fastener 48 for detaching the lower ladder portion 36 from the bumper bracket 44. The lower fastener 48 may take the form of a nut and bolt or other types of fasteners; however, a lower fastener 48 such as the camlock shown in FIG. 7, FIG. 8A, and FIG. 8B allows a user to install or disconnect the lower ladder portion 36 to and from the bumper bracket 44 without requiring tools. Furthermore, the camlock type of lower fastener 48 is able to better support the heavy weight of a user in comparison with other types of fasteners.

The dual-pivot attachment provided by the rack mounting assembly 10, rung tabs 33, and pivot fasteners 15a, 15b ensures that the bumper of the vehicle has movement that is independent of the body, as intended by the flexible body mounts of the vehicle. Furthermore, the use of snap pins 15a, 15b and lower fasteners 48 enables a user to remove the ladder assembly 30 from the vehicle or install it onto the vehicle without the need for additional tools.

While particular embodiments of the invention have been described and disclosed in the present application, it is clear that any number of permutations, modifications, or embodiments may be made without departing from the spirit and the scope of this invention. Accordingly, it is not the inventor's intention to limit this invention in this application, except as by the claims.

Particular terminology used when describing certain features or aspects of the invention should not be taken to imply that the terminology is being redefined herein to be restricted to any specific characteristics, features, or aspects of the invention with which that terminology is associated. In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise embodiment or form disclosed herein or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

In general, the terms used in the claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

In light of the above "Detailed Description," Inventor may make changes to the invention. While the detailed description outlines possible embodiments of the invention and discloses the best mode contemplated, no matter how detailed the above appears in text, the invention may be practiced in a myriad of ways. Thus, implementation details may vary considerably while still being encompassed by the spirit of the invention as disclosed by the inventor. As discussed herein, specific terminology used when describing certain features or aspects of the invention should not be taken to imply that the terminology is being redefined herein to be restricted to any specific characteristics, features, or aspects of the invention with which that terminology is associated.

What is claimed is:

1. A roof rack side ladder system for allowing access to the roof of a vehicle having a roof rack and a side bumper wing, the roof rack side ladder system comprising:
    a ladder assembly having an upper ladder portion and a lower ladder portion and comprising two side rails oriented in parallel and interconnected by a plurality of rungs, two rung tabs directly fastened to a top rung of said plurality of rungs, and two lower rail support clevises, each said rung tab comprising a tab slot for securing said top rung to said rack mounting assembly and a concave portion, each said concave portion directly fastened to said top rung, each said lower rail support clevis directly fastened to one of said side rails adjacent to said lower ladder portion;
    a rack mounting assembly for securing said upper ladder portion of said ladder assembly to the roof rack; and
    a bumper bracket for securing said lower ladder portion of said ladder assembly to the side bumper wing of the vehicle.

2. The roof rack side ladder system of claim 1, wherein said bumper bracket comprises a mounting extension with a terminal extension at each end protruding from said mounting extension at substantially 90 degrees, wherein each said terminal extension defines a bracket slot adapted for receiving a respective lower fastener for securing one of said lower rail support clevises thereto said terminal extension, wherein each said lower fastener is inserted there through one of said bracket slots and one of said lower rail support clevises.

3. The roof rack side ladder system of claim 2, wherein each said lower fastener is a camlock.

4. The roof rack side ladder system of claim 3, wherein each said cam lock comprises a cam lock nut, a cam lock bolt, and a lever, wherein said cam lock nut comprises threading matching that of said cam lock bolt and is rotatable about said cam lock bolt for tightening or loosening said cam lock bolt against one of said lower rail support clevises and one of said terminal extensions, whereby rotation of said lever to a locked configuration increases force of said cam lock bolt to one of said lower rail support clevis and one of said terminal extension, whereby rotation of said lever to an unlocked configuration lessens force of said cam lock bolt to said lower rail support clevis and said terminal extension.

5. The roof rack side ladder system of claim 1, wherein said ladder assembly further comprises one or more bends for improved installment of the roof rack ladder system to more numerous vehicles.

6. The roof rack side ladder system of claim 1, wherein said first pivot fastener is a snap pin.

7. The roof rack side ladder system of claim 1, wherein said first pivot fastener is a snap pin.

8. A roof rack side ladder system for allowing access to the roof of a vehicle having a roof rack and a side bumper wing, the roof rack side ladder system comprising:
- a ladder assembly having an upper ladder portion and a lower ladder portion and comprising two side rails oriented in parallel and interconnected by a plurality of rungs, two rung tabs directly fastened to a top rung of said plurality of rungs, and two lower rail support clevises, each said lower rail support clevis directly fastened to one of said side rails adjacent to said lower ladder portion;
- a bumper bracket for securing said lower ladder portion of said ladder assembly to the side bumper wing of the vehicle;
- a rack mounting assembly for securing said upper ladder portion of said ladder assembly to the roof rack, said rack mounting assembly comprising
- a rack plate;
- a rack plate clevis directly fastened to the center thereof said rack plate;
- a connecting arm having a first end portion and a second end portion; and
- a first pivot fastener for securing said first end portion of said connecting arm to said rack plate clevis, wherein said first pivot fastener is inserted there through said rack plate clevis and a first connecting arm slot on said first end portion of said connecting arm.

9. The roof rack side ladder system of claim 8, wherein said rack mounting assembly further comprises a grommet for preventing frictional damage between said connecting arm and said rack plate clevis, wherein said grommet is inserted there through a first connecting arm slot adjacent to said first end portion of said connecting arm, whereby said first pivot fastener is further inserted there through a grommet slot of said grommet.

10. The roof rack side ladder system of claim 8, wherein said second end portion of said connecting arm is secured there between said two rung tabs via a second pivot fastener inserted there through said two rung tabs and a second connecting arm slot on said second end portion of said connecting arm.

11. The roof rack side ladder system of claim 10, wherein said connecting arm is rotatable about said second pivot fastener for lessening load transfer between the roof rack and the vehicle body.

12. The roof rack side ladder system of claim 8, wherein a spacing between said two rung tabs is greater than a thickness of said connecting arm.

13. The roof rack side ladder system of claim 8, wherein said connecting arm is rotatable about said first pivot fastener for lessening load transfer between the roof rack and the vehicle body.

14. The roof rack side ladder system of claim 8, wherein said rack plate is directly fastened the roof rack of the vehicle.

* * * * *